April 22, 1924.
F. C. STÖCKEL
1,491,435
PARING MACHINE FOR FRUITS AND VEGETABLES
Filed July 27, 1922   2 Sheets-Sheet 1
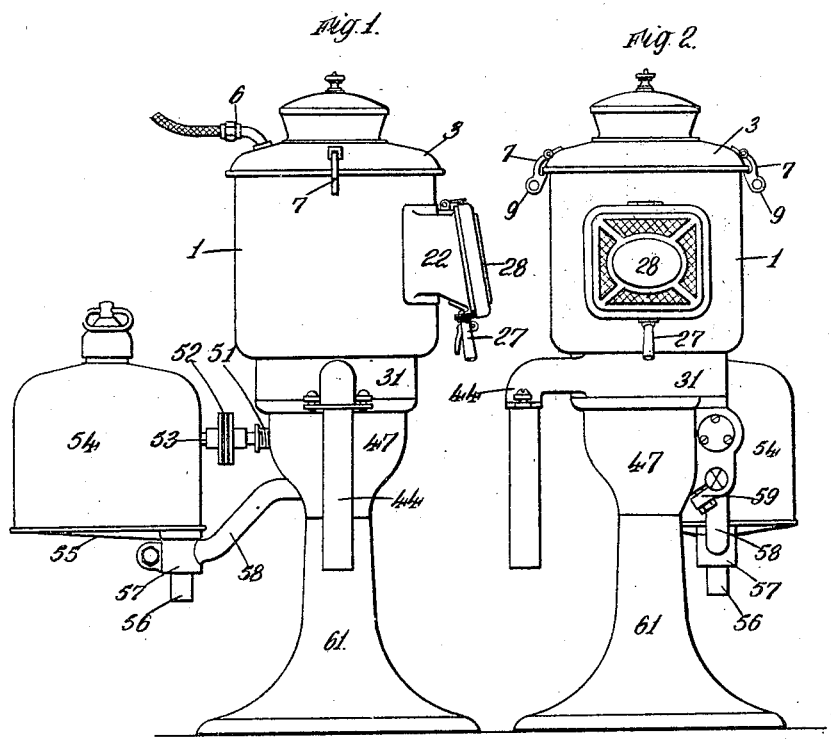
INVENTOR
Frants Christian Stöckel
by Chas. J. O'Neill
ATTORNEY April 22, 1924.  1,491,435

F. C. STÖCKEL

PARING MACHINE FOR FRUITS AND VEGETABLES

Filed July 27, 1922  2 Sheets-Sheet 2

INVENTOR
Frants Christian Stöckel
by Chas J O'Neill
ATTORNEY

Patented Apr. 22, 1924.

1,491,435

UNITED STATES PATENT OFFICE.

FRANTS CHRISTIAN STÖCKEL, OF BAYSWATER, LONDON, ENGLAND.

PARING MACHINE FOR FRUITS AND VEGETABLES.

Application filed July 27, 1922. Serial No. 577,920.

To all whom it may concern:

Be it known that I, FRANTS CHRISTIAN STÖCKEL, a subject of the King of Denmark, residing at 61 Talbot Road, Bayswater, in the county of London, England, have invented certain new and useful Improvements in or Relating to Paring Machines for Fruits and Vegetables, of which the following is a specification.

This invention has reference to vegetable and fruit paring machines of the kind wherein the vegetable or fruit is arranged on a rotatable tray within a container and is brought into contact with an abrading surface provided in the container and the skin or outer coating thereby removed is entrained by liquid sprayed into the upper part of the container and discharged therewith through a waste outlet and the pared vegetable or fruit is delivered from the container through a chute provided thereon and normally closed by a door secured thereto.

According to this invention one or more parts of the machine is or are adjustable relatively to another part or other parts thereof to adapt it for use in any desired position and also facilitate its use. The adjustability of the parts relatively to each other enables the spraying means, waste outlet, chute or driving means to be disposed in any convenient position according to circumstances. Further according to this invention the abrading means is made interchangeable and removable, the door for the chute is fitted with an abrading plate corresponding to a chute aperture in the abrading cylinder and the container is fitted with a cover adapted to be detachably and adjustably secured thereto and to hold the abrading cylinder against vertical movement therein and is fitted with the spraying means.

The container is preferably made of sheet metal and formed with a rolled upper edge with which engage hook fastening means attached to the cover of sheet metal. Within the container is disposed the abrading cylinder of cast metal, the abrading substance being incorporated with the inner surface during the casting thereof, and within such cylinder is disposed the tray for supporting the vegetable or fruit opposite the chute aperture which, when the machine is in use is closed by the abrading plate attached to the chute door hinged to the container. The container is adjustably mounted on a waste receptacle provided with the waste outlet and fitted with a bearing for the spindle of the vegetable or fruit tray and such spindle is supported in a footstep bearing formed in a gear box on which the waste receptacle is adjustably mounted and on such gear box is also adjustably mounted a support for the motor for driving the gear and rotating the tray, such support being adjustable laterally and vertically to enable the shaft of the motor to be easily and quickly arranged in approximate alignment with the shaft of the gear to which it is connected preferably by a flexible coupling. The gear box is mounted on a pedestal by a central plate which is held in engagement with an annular flange on the upper end of the pedestal.

In order that the invention may be clearly understood and readily carried into effect the same will be more fully described by way of example with reference to the accompanying drawings in which:—

Figures 1 and 2 are side elevations at right angles to each other illustrating the machine as a whole.

Figure 3:
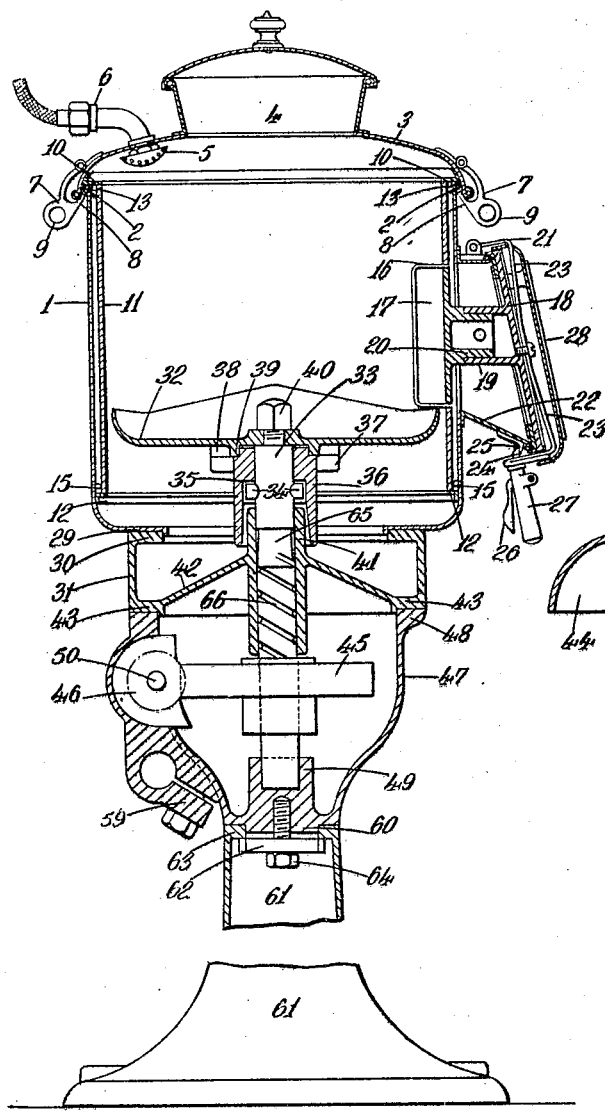
Figure 3 illustrates in section the upper part of the machine.
Figure 4:
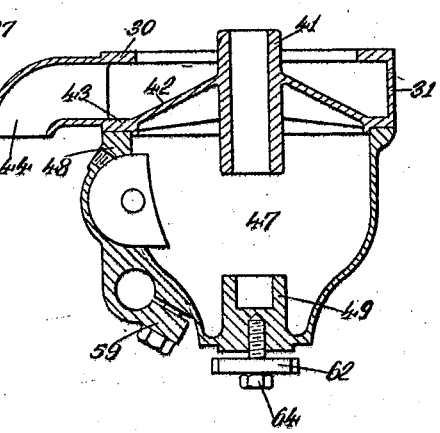
Figure 4 is a sectional elevation of parts of the machine illustrating the same in a different relative position to that shown in Figure 3.

The sheet metal container 1 with its rolled upper edge 2 is fitted with a sheet metal cover 3 provided with a normally closed central aperture 4 and spraying means 5 with which is connected a supply pipe 6. The cover 3 is secured to the container 1 by hooks 7 which are hinged to the cover and formed with extensions 8 for engaging the rolled edge 2 and may be formed with apertured weighted lower ends 9 for ensuring engagement of the extensions 8 with the said edge and for convenience in handling the same. This means of attachment enables the cover to be set in and turned to any desired position with respect to the container 1 and thus facilitates the connection of the supply pipe 6 with a suitable source of liquid for spraying purposes. The cover 3 is formed with a lip or annular flange 10 which, when in position on the container bears against the upper end of the abrading cylinder 11 supported on a ring 12 attached to the inside of the container. Preferably the ends of the cylinder 11 have flanges 13 and in such flanges may be formed notches adapted to engage with projections 16 on the inside of the container 1 close to the ring 12, for holding the cylinder against circular movement.

The chute aperture 16 in the abrading cylinder 11 is formed in the middle of the length thereof to enable the cylinder to be reversed and the aperture to occupy the same relative position, and thus enable the whole of the abrading surface to be made use of before substituting another cylinder therefor. The chute aperture 16 is occupied by an abrading plate 17 curved to correspond to the curvature of the cylinder and similarly made thereto and such plate is attached to the chute door 18 by means of an extension 19 thereon extending into and being connected to a recessed boss 20 formed on the back of the plate 17. The chute door 18 which closes the outer end of the chute 22 secured to the container around the outlet formed therein is secured to an intermediate part in the length of a spring plate 23 one end of which is hinged at 21 and the other end of which is fitted with a pivoted detent 24 adapted to engage with a lug 25 on the chute 22 and to be operated by a lever 26 mounted on a handle 27 whereby the chute door 18 is manipulated. The spring plate 23 is preferably enclosed by a plate 28 adapted to fit over the chute door and provide a finished appearance thereto. The lower end of the container 1 is formed with an inwardy extending annular flange 29 adapted to be mounted on the upper apertured wall 30 of the waste receptacle 31 and to be secured thereto by bolts engaging with holes spaced therearound so as to enable the one part to be disposed at any desired position relatively to the other. Within the cylinder is disposed the vegetable or fruit supporting tray 32 which is mounted on the upper end of the spindle 33 provided in its length with projections 34 adapted to engage recesses 35 in the inner surface of a sleeve member 36 at the upper end of which is provided a plate 37 formed with slots 38 for receiving projections 39 on the outer surface of the tray the latter being secured to the upper end of the spindle 33 by a bolt 40 which secures the sleeve member 36 against the projection 34. In this manner the tray is firmly secured in position and an efficient means provided for transmitting rotary motion thereto. The sleeve member 36 extends over the upper end of the bearing 41 forming part of the waste receptacle 31 and prevents any waste material passing thereinto, and from such bearing extends a dished plate 42 which causes the waste material to gravitate to the outer margin or base 43 of the receptacle to the waste outlet 44 provided on the receptacle. The bearing 41 extends downwardly from the dished plate 42 and the spindle 33 projects therefrom and has mounted on it a worm wheel 45 which gears with a worm 46 and is mounted with the latter in a gear box 47 the upper end 48 of which serves to support the waste receptacle, the outer margin or base 43 and the said upper end 48 being suitably provided with apertures for the passage of bolts for securing together the parts in different relative positions. The lower end of the spindle 33 is mounted in the footstep bearing 49 in the gear box 47 and the shaft 50 of the worm 46 projects through a packing gland 51 (Figure 1) and is connected by the flexible coupling 52 to the shaft 53 of the motor contained in the housing 54 the base 55 of which is provided with a rod 56 mounted in a split bush 57 at one end of a cranked bar 58 the other end of which is secured in a split socket 59 on the gear box 47. By supporting the motor housing through the medium of the cranked bar 58 it can be raised and lowered relatively thereto by adjusting the rod 56 in the split bush 57, and can be laterally adjusted by turning the bar in the split socket 59. The split bush and socket may be tightened by bolts as shown. The gear box 47 is formed at its lower end with a central projecting part 60 adapted to take into a flanged aperture at the upper end of the pedestal 61 and a plate 62 which engages with the annular flange 63 of the aperture is attached to the gear box by a bolt 64 and thereby serves to secure the two parts firmly together and also enables the one part to be turned relatively to the other part. The base of the pedestal is provided with bolt holes for securing it to a suitable base.

The spindle 33 is formed with a recessed annular portion 65 and a left hand spiral channel or groove 66 to facilitate lubrication of the spindle and to prevent the passage of the lubricant to the upper end of the bearing 41 and its escape into the waste receptacle. In the rotation of the spindle 33 the lubricant travels upwardly and collects in the space between the recessed portion 65 and the inner surface of the bearing 41 and then passes from said space by way of the spiral groove 66.

What I claim and desire to secure by Letters Patent of the United States is:—

1. A vegetable and fruit paring machine comprising a waste receptacle, a container mounted thereon and a gear box on which the waste receptacle is capable of angular adjustment to a number of different positions.

2. A vegetable and fruit paring machine comprising a delivery chute, a waste outlet and a gear box angularly adjustable relatively to each other to a number of different positions and a base for supporting a motor for operating the machine, the said base being adjustable to the gear box.

3. A vegetable and fruit paring machine comprising a container, a waste receptacle, a gear box and a pedestal all of which are angularly adjustable relatively to each other to a number of different positions about the center of the said machine.

4. A vegetable and fruit paring machine comprising a container, a waste receptacle, a gear box and a pedestal all of which are angularly adjustable relatively to each other to a number of different positions about the center of the said machine, and a base for supporting a motor for operating the machine, the said base being adjustable relatively to the gear box.

5. A vegetable and fruit paring machine comprising a container, an abrading cylinder within the container, a support for the vegetable or fruit within the cylinder, a delivery chute for the pared vegetable or fruit, means adjustable vertically in relation to the container for obtaining relative motion between the cylinder and support and a waste outlet angularly adjustable to a number of different positions relatively to the said chute.

6. A vegetable and fruit paring machine comprising a container, an abrading cylinder within the container, a support for the vegetable or fruit within the cylinder, a delivery chute for the pared vegetable or fruit, means adjustable in a horizontal plane in relation to the container for obtaining relative motion between the cylinder and support and a waste outlet angularly adjustable to a number of different positions relatively to the chute.

7. A vegetable and fruit paring machine comprising a container, an abrading cylinder within the container, a support for the vegetable or fruit within the cylinder, a delivery chute for the pared vegetable or fruit, means adjustable vertically and horizontally in relation to the container for obtaining relative motion between the cylinder and support and a waste outlet angularly adjustable to a number of different positions relatively to the chute.

8. A vegetable and fruit paring machine comprising a container, a delivery chute therefor fitted with a door, a removable and reversible abrading cylinder within the container formed with an aperture registering with the chute, a curved abrading plate attached to the chute door and capable of registering with the said aperture, an angularly adjustable waste outlet capable of being arranged in a number of different positions relatively to the chute and a support for the vegetable or fruit and means for rotating the support.

9. A vegetable and fruit paring machine comprising a container, a delivery chute therefor, a removable and reversible abrading cylinder within the container formed with an aperture registering with the chute, a curved abrading plate attached to the chute door and capable of registering with the said aperture, a waste outlet capable of angular adjustment to a number of different positions relatively to the chute, a support for the vegetable or fruit, gearing connected with the support, a gear box angularly adjustable relatively to the container, and means for driving the gearing and rotating the support such means being adjustable relatively to the gear box.

10. A vegetable and fruit paring machine comprising a container with a delivery chute, an abrading cylinder arranged within the container and formed with an aperture registering with the chute, an angularly adjustable waste outlet capable of being arranged in a number of different positions relatively to the said chute, a support for the vegetable or fruit, gearing connected with the support, means for driving the gearing and rotating the support and a vertically, horizontally and radially adjustable carrier for the driving means.

11. A vegetable and fruit paring machine comprising a container with a delivery chute, an abrading cylinder arranged within the container and formed with an aperture registering with the chute, an adjustable waste outlet capable of being arranged in a number of different positions relatively to the said chute, a support for the vegetable or fruit, a recessed and spirally grooved spindle for the support, gearing connected with the spindle, means for driving the gearing and rotating the support and a vertically, horizontally and radially adjustable carrier for the driving means.

12. A vegetable and fruit paring machine comprising a container, an abrading cylinder arranged within the container and provided with an aperture, a delivery chute on the container a closure means for the chute, an abrading plate on the closure means for registering with the aperture in the abrading cylinder. a waste outlet capable of being arranged in a number of different positions relatively to the said chute, a support for the vegetable or fruit, a recessed and spirally grooved spindle attached to the support, gearing connected with the spindle and vertically, horizontally and radially adjustable driving means for the gearing.

13. A vegetable and fruit paring machine, comprising a container, an abrading cylinder arranged within the container and provided with an aperture, a delivery chute in the container, a spring controlled closure means for the chute, a removable and reversible abrading plate on the closure means for registering with the aperture in the abrading cylinder, a waste outlet angularly adjustable to a number of different positions relatively to the delivery chute, an adjustable and detachable cover for the container, a spraying device mounted on the cover, a support for the vegetable or fruit, a recessed and spirally grooved spindle attached to the support, gearing connected with the spindle and vertically, horizontally and radially adjustable driving means for the gearing.

14. A vegetable and fruit paring machine comprising a sheet metal container provided with a delivery chute fitted with a closure means, an abrading cylinder within the container, a waste receptacle communicating with and on which the container is capable of being adjusted to a number of different positions, a waste outlet connected with the receptacle, a support for the vegetable or fruit, a spindle attached to the support, gearing connected with the spindle, a gear box which contains the gearing and on which the waste receptacle is capable of being angularly adjustable to a number of different positions, a pedestal on which the gear box is angularly adjustable, and a driving means connected with the gearing.

15. A vegetable and fruit paring machine comprising a sheet metal container with a rolled upper edge, a reversible cast metal abrading cylinder with an aperture, a delivery chute attached to the container, a spring controlled closure means for the chute fitted with an abrading plate registering with the aperture in the cylinder, an angularly adjustable cover fitted with hooks for detachably attaching the cover to the container, a spraying device attached to the cover, a vegetable and fruit support fitted with a sleeve, a recessed and spirally grooved spindle carrying the support, an angularly adjustable waste receptacle embodying a dished bottom plate a bearing for the said spindle and an angularly adjustable gear box with a bearing for the said spindle, gearing within the gear box, a driving means for the gearing, an adjustable base for supporting the driving means on the gear box, and a stand on which the gear box is angularly adjustable.

FRANTS CHRISTIAN STÖCKEL.